(12) United States Patent
Rieger et al.

(10) Patent No.: US 11,192,054 B2
(45) Date of Patent: Dec. 7, 2021

(54) FILTER ELEMENT, IN PARTICULAR FOR GAS FILTRATION

(71) Applicant: MANN+HUMMEL GmbH, Ludwigsburg (DE)

(72) Inventors: Mario Rieger, Ludwigsburg (DE); Pedro Miguel Pereira Madeira, Bietigheim-Bissingen (DE); Stefan Kunze, Tuebingen (DE); Ulrich Dehnen, Kornwestheim (DE); Johannes Stuerner, Amsterdam (NL); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/935,677

(22) Filed: Jul. 22, 2020

(65) Prior Publication Data
US 2020/0346153 A1    Nov. 5, 2020

Related U.S. Application Data

(63) Continuation of application No. PCT/EP2019/050170, filed on Jan. 4, 2019.

(30) Foreign Application Priority Data

Jan. 24, 2018  (DE) .................... 10 2018 000 540.3

(51) Int. Cl.
*B01D 50/00*   (2006.01)
*B01D 46/00*   (2006.01)
(Continued)

(52) U.S. Cl.
CPC ......... *B01D 46/0045* (2013.01); *B01D 45/16* (2013.01); *B01D 46/2403* (2013.01); *B01D 46/521* (2013.01); *B01D 50/002* (2013.01); *B01D 46/2411* (2013.01); *B01D 46/2414* (2013.01); *B01D 2265/024* (2013.01); *B01D 2265/026* (2013.01); *B01D 2275/208* (2013.01);
(Continued)

(58) Field of Classification Search
CPC ................ B01D 46/0045; B01D 45/16; B01D 46/2403; B01D 46/521; B01D 50/002; B01D 2275/208; B01D 2279/60; B01D 2265/024; B01D 2265/026; B01D 46/2414; B01D 46/0046; B01D 46/2411; F02M 35/02433; F02M 35/02475; F02M 35/0201; F02M 35/0216; F02M 35/0223; F02M 35/02483
See application file for complete search history.

(56) References Cited

U.S. PATENT DOCUMENTS 3,429,108 A * 2/1969 Larson ................... B01D 46/24
                                                   55/432
4,135,899 A * 1/1979 Gauer ................ B01D 46/0024
                                                   210/338
(Continued)

*Primary Examiner* — Dung H Bui

(57) ABSTRACT

A filter element is provided with an annular filter medium body and an end disk arranged at an end face of the annular filter medium body. Guide vanes are arranged adjacent to the end disk, wherein the guide vanes extend radially past an outer contour of the end disk and project into a flow path upstream of an inflow side of the annular filter medium body. The guide vanes are held at the end disk.

6 Claims, 5 Drawing Sheets

(51) Int. Cl.
   *B01D 45/16* (2006.01)
   *B01D 46/24* (2006.01)
   *B01D 46/52* (2006.01)
   *F02M 35/024* (2006.01)
   *F02M 35/022* (2006.01)
   *F02M 35/02* (2006.01)

(52) U.S. Cl.
   CPC ..... *B01D 2279/60* (2013.01); *F02M 35/0201* (2013.01); *F02M 35/0216* (2013.01); *F02M 35/0223* (2013.01); *F02M 35/02433* (2013.01); *F02M 35/02475* (2013.01); *F02M 35/02483* (2013.01)

(56) References Cited

U.S. PATENT DOCUMENTS

| | | | |
|---|---|---|---|
| 4,162,905 A * | 7/1979 | Schuler | B01D 45/16 55/337 |
| 5,509,948 A * | 4/1996 | Keller | B01D 50/002 55/337 |
| 6,423,225 B2 * | 7/2002 | Wong | B01D 27/08 210/304 |
| 6,833,023 B1 * | 12/2004 | Vandenberghe | B01D 29/906 55/337 |
| 6,843,377 B1 * | 1/2005 | Roll | B01D 29/21 210/437 |
| 7,001,440 B1 | 2/2006 | Chilton | |
| 7,232,035 B1 * | 6/2007 | Crawford | B01D 27/00 210/456 |
| 2007/0251199 A1 | 11/2007 | Valentini | |
| 2014/0083299 A1 * | 3/2014 | Yamase | B01D 46/24 96/416 |
| 2014/0130467 A1 * | 5/2014 | Herman | B01D 46/125 55/414 |
| 2015/0068169 A1 * | 3/2015 | Schulz | B01D 45/12 55/337 |
| 2016/0296872 A1 | 10/2016 | Stark et al. | |
| 2017/0319027 A1 * | 11/2017 | Hyun | A47L 9/1608 |
| 2018/0036746 A1 * | 2/2018 | Antomon | B04C 5/08 |
| 2018/0169553 A1 * | 6/2018 | Billiet | B01D 45/16 |
| 2018/0245548 A1 * | 8/2018 | Varghese | B01D 46/0002 |

\* cited by examiner

FILTER ELEMENT, IN PARTICULAR FOR GAS FILTRATION

CROSS-REFERENCE TO RELATED APPLICATIONS

This application is a continuation application of international application No. PCT/EP2019/050170 having an international filing date of 4 Jan. 2019 and designating the United States, the international application claiming a priority date of 24 Jan. 2018 based on prior filed German patent application No. 10 2018 000 540.3, the entire contents of the aforesaid international application and the aforesaid German patent application being incorporated herein by reference.

BACKGROUND OF THE INVENTION

The invention concerns a filter element, in particular for gas filtration, with an annular filter medium body and an end disk at least one end face of the filter medium body.

U.S. Pat. No. 3,816,982 describes an air filter with a hollow-cylindrical filter element in a receiving filter housing. The air to be filtered is introduced via an inflow opening, arranged laterally in the filter housing and axially upstream of the filter element, and flows subsequently through the filter element radially from the exterior to the interior. The filter element comprises at its oppositely positioned end faces an open and a closed end disk. The purified air is discharged axially from the interior of the hollow-cylindrical filter element via the open end disk.

In DE 10 2013 015 052 A1, a filter device for purifying a gas flow is described that comprises a hollow-cylindrical filter element and an also hollow-cylindrical preseparator that surrounds the filter element and at whose outer side guide vanes are arranged, distributed about the circumference. The supplied gas flow experiences at the guide vanes a deflection and acceleration which leads to separation of coarse contaminants such as dirt and dust particles.

DE 10 2010 049 411 A1 discloses a filter element for an air inlet system with a filter medium body for purifying raw air. The filter medium body is embodied as a hollow body with elongate cross-sectional shape and comprises end disks at its axial end faces. Along a narrow side of the filter medium body, guide vanes are arranged axially distributed that serve for flow guiding in the inflow region.

SUMMARY OF THE INVENTION

It is the object of the invention to configure a filter element with an annular filter medium body with simple constructive measures in such a way that dirt particles are separated from the fluid flow to be filtered prior to flowing through the filter medium body.

This object is solved according to the invention in that at the filter element adjacent to the end disk a plurality of guide vanes are arranged which extend radially past the outer contour of the end disk and project into a flow path upstream of the inflow side of the filter medium body, wherein the guide vanes are held at the end disk.

The dependent claims provide expedient further embodiments.

The filter element according to the invention comprises an annular filter medium body at which the filtration of a fluid to be purified takes place. The filter element is used in particular for gas filtration, for example, for filtration of the combustion air to be supplied to an internal combustion engine. In principle, however, a use for liquid fluids is conceivable also.

The annular filter medium body of the filter element is flowed through by the fluid to be purified in radial direction, in particular radially from the exterior to the interior, so that the outer side of the filter medium body is the inflow side or raw side and the inwardly positioned side the clean side. In principle, a reverse flow through the filter medium body radially from the interior to the exterior is also conceivable. The filter medium body is in particular of an annular closed configuration and comprises an inwardly positioned flow space for the fluid.

An end face of the in particular annular closed filter medium body is provided with a closed end disk that axially closes off the inwardly positioned flow space at this location. At the axially oppositely positioned end face, relative to the longitudinal axis of filter element and filter medium body, an open end disk is preferably arranged at the filter medium body and comprises a central cutout through which fluid can be discharged from the inwardly positioned flow space of the filter medium body or introduced into it. Adjacent to an end disk at an end face of the filter medium body, a plurality of guide vanes are arranged which extend radially relative to the longitudinal axis of the filter element past the outer contour of the end disk and project into a flow path that is upstream of the inflow side of the filter medium body.

The guide vanes are located preferably adjacent to the end disk that is of a closed embodiment at the filter medium body. In addition or as an alternative, it is also possible to arrange guide vanes adjacent to the axially oppositely positioned open end disk. Via the open end disk, fluid can be axially discharged out of the inwardly positioned flow space in the filter medium body or, in case of a radial flow through the filter medium body from the interior to the exterior, introduced axially into the inwardly positioned flow space.

The fluid is flowing against the guide vanes that influence the fluid flow. The latter is in particular imparted with a swirl which is beneficial to the separation of dirt particles entrained in the fluid. The fluid flow imparted with a swirl begins to circulate in particular in circumferential direction so that the entrained dirt particles in the fluid are transported outwardly and can separate at the inner side of a housing wall. This housing wall is in particular the outer wall of the filter housing receiving the filter element.

Various embodiments are conceivable as regards how the guide vanes are arranged relative to the end disk of the filter medium body. Advantageously, the guide vanes are uniformly distributed about the circumference of the end disk. As an alternative thereto, it is also possible to provide a non-uniform distribution of the guide vanes in that, for example, a section along the circumference of the end disk remains free of guide vanes and forms either a free flow cross section at this location or is completely closed. In this way, it is possible to additionally influence the fluid flow that is supplied to the inflow side of the filter medium body.

The guide vanes are fastened to the end disk at the filter element adjacent to which the guide vanes extend in radial direction outwardly. It can be advantageous to design the guide vanes such that the free end face of the guide vanes is positioned at an axial distance to the end disk, for example, displaced axially relative to the end disk in the direction toward the filter medium body or, in opposite direction, farther removed axially from the end disk and thus axially positioned outside of the filter medium body. According to a further expedient embodiment, the guide vanes are positioned axially at least approximately at the same level as the end disk.

The annular filter medium body of the filter element comprises, according to a further advantageous embodiment, an elongate cross-sectional shape. The inwardly positioned flow space is enclosed by longitudinal sides and narrow sides of the filter medium body. The cross-sectional shape of the filter medium body can be oval or ovalized. Non-oval elongate cross-sectional shapes are also conceivable, for example, concavely curved longitudinal sides or straight-surfaced, flat longitudinal sides or non-oval curved convex longitudinal sides. The extension of the longitudinal sides is larger than the extension of the narrow sides; for example, it can be expedient that the extension of the longitudinal sides is at least twice as large as the extension of the narrow sides. The narrow sides are provided, for example, with a semi-circular cross-sectional shape.

The elongate cross-sectional shape of the filter medium body or of the filter element has the advantage that installation spaces that are of a relatively low height can be used. Also, a large inflow surface is provided at the longitudinal sides of the filter medium body at which identical or at least similar flow conditions are present.

As an alternative to an elongate annular cross-sectional shape, it is also possible that the filter medium body has a circular cross-sectional shape.

The filter element and the filter medium body can have across the axial length, relative to the longitudinal axis of the filter element, a non-constant cross section that changes from one end face to the oppositely positioned end face. For example, the cross section increases from the closed end disk to the oppositely positioned open end disk.

As an alternative to a non-constant cross section, filter elements or filter medium bodies with a constant cross section across the length are possible also, for example, in the form of a hollow cylinder with circular or non-round cross section. According to a further advantageous embodiment, one or a plurality of guide vanes comprise a curved flow guiding section. The curved flow guiding section imparts a desired swirl to the impinging fluid flow. In an embodiment of the filter medium body with elongate cross-sectional shape, the guide vanes with the curved flow guiding section are advantageously located in the region of the narrow side of the filter medium body.

According to a further advantageous embodiment, one or a plurality of guide vanes comprise a straight or at least approximately straight flow guiding section. The latter is located preferably at the longitudinal sides of the filter medium body in an embodiment of the filter medium body with elongate cross-sectional shape. The straight and at least approximately straight flow guiding section adjoins in particular a fastening section of the guide vane by means of which the guide vane is fastened at the filter element. An angle between 10° and 80°, for example, between 30° and 60°, is preferably present between the flow guiding section and the fastening section of the guide vane.

The invention concerns moreover a filter device with an afore described filter element and with a filter housing in which the filter element is received. The guide vanes of the filter element are preferably arranged in a flow passage that is positioned between an end face of the filter element and the inner side of the outer wall of the receiving filter housing.

In the filter housing, preferably a filter element that can be flowed through radially is exchangeably mountable. As mentioned, it comprises moreover further preferred an elongate, oval cross-sectional shape arranged about the longitudinal axis. Also preferred, the filter housing comprises an oval, elongate cross section. It can be formed of a filter base housing and an upstream inlet housing, in particular as one piece. The filter base housing preferably accommodates the filter element. The filter base housing comprises preferably an outer wall, arranged circumferentially around the longitudinal axis, with preferably also oval, elongate cross-sectional shape. Further preferred, the filter element and the filter housing, in particular its outer wall, are designed such that across the axial length of the filter element the distance between inner side of the outer wall and the filter element, in particular the outer side of the filter medium body, is constant around the circumference in order to make the flow as resistance-free as possible. The oval cross-sectional shape of filter element and filter housing comprises preferably two oppositely positioned narrow sides with strong curvature which are respectively connected to each other by two oppositely positioned longitudinal sides with weak curvature or even a straight course. Preferably, filter element and/or outer wall of the filter base housing are configured substantially with axial symmetry relative to the central or longitudinal axis. Length to width ratios of the oval cross-sectional shape of the filter housing and/or of the filter element amount to preferably at least 2:1, preferably at least 3:1, in particular for the filter element optionally at least 4:1.

The inflow opening and the overflow opening in the inlet housing are connected to each other by an inlet channel. The inlet channel can be arranged within the inlet housing or, in a preferred embodiment, the inlet channel is formed by the inlet housing. The cross-sectional shape of the inlet channel changes across its length in such a way that a channel section positioned between inflow opening and overflow opening comprises a cross-sectional shape that differs from the cross-sectional shape of the inflow opening as well as from the cross-sectional shape of the overflow opening. The changing cross-sectional shape of the inlet channel has the advantage that it is possible to influence the fluid flow. In particular, it is possible to impart a swirl to the flow in order to generate a rotational preseparation prior to the flow passing through the filter element. In this connection, the region upstream of the overflow to the filter element is referred to as inlet channel and its cross section, in particular upstream of passing through the overflow opening that is preferably arranged at the level of an open or closed end disk. In this context, it will become apparent in the following that the effective cross section that is available for entry and transfer of the air to the filter element or for the transfer into the rotating flow is partially larger or can be larger due to the circumferential successive passage of the air through the overflow opening, as described in the following, compared to the cross section of the inlet channel that is available upstream of the overflow opening.

The inlet channel comprises, for example, a jet-like cross-sectional course in which the cross-sectional shape of the intermediately positioned channel section relative to the cross-sectional shape of the inflow opening and of the overflow opening is flattened or narrowed, for example, comprises in the intermediately positioned channel section an extension that in axial direction is elongate and in radial direction narrowed and/or reduced compared to the inflow opening. This configuration has the advantage that a jet effect with a flow acceleration can be achieved and an adaptation of the flow cross section to the flow passage region between end disk and filter housing inner wall is achieved. The flow acceleration leads to a higher speed vector of the entrained dirt particles that, as a result of their inertia, maintain their comparatively high speed longer in the subsequent flow calming action and, upon change of the flow direction, are transported radially outwardly, in particular into a conically widening housing region. In this way, the preseparation effect can be improved.

It can be expedient that the inflow opening has a circular cross-sectional shape or an oval cross-sectional shape with a low height to width ratio while the adjoining channel section is flattened, wherein the minimal height of the channel section in the region of the flattened area can be reduced to maximally half of the diameter of the inflow opening. A low height to width ratio of the inflow opening is considered to be preferably a ratio near 1, in particular larger than 0.5 or smaller than 2; preferred for safe-guarding are ratios larger than 2/3 or smaller than 1.5, wherein the circular shape is the optimum due to the therefore simpler and less expensive joining and sealing.

According to yet another advantageous embodiment, the flow cross section of the overflow opening is larger than the flow cross section of the inflow opening. Via the overflow opening, the fluid to be purified can be conveyed in the direction toward the inflow side of the filter medium body. The relatively large overflow opening enables a uniform inflow at the filter medium body from various sides. It is in particular expedient that the cross section of the overflow opening of the inlet channel corresponds to the cross section of the adjoining filter base housing that serves for receiving the filter element. In this way, it is ensured that the inlet channel in the region of the overflow opening adjoins without cross-sectional change the filter base housing so that in the transfer of the fluid from the inlet channel to the filter base housing a desired flow can be adjusted, for example, an imparted swirl of the flow is maintained and, for example, a corresponding swirl is produced by guide vanes.

According to an advantageous embodiment, the inlet channel comprises at least one bent section and experiences in the region of the bent section a directional change of at least 45°. The directional change can amount to, for example, 90° or approximately 90°. Moreover, it can be expedient that the inlet channel comprises at least two bent sections wherein the curvatures can extend optionally in different directions in order to effect a deflection of the fluid flow in different directions. In the region of each bent section, the curvature amounts to at least 45°, as needed 90° or approximately 90°. This makes it possible, for example, by a double 90° deflection, to initially introduce the fluid into the inlet channel via the inflow opening at a right angle as well as displaced relative to the longitudinal axis of the filter element, subsequently guide it via the first bent section in radial direction relative to the longitudinal axis, and then guide it in a second bent section axis-parallel via the overflow opening to the filter element. The intermediately positioned channel section is positioned preferably between the bent sections.

The bent section or the bent sections in the inlet channel impart a swirl to the fluid flow. Entrained dirt particles are guided radially outwardly. The swirl that is imparted to the fluid flow by means of the bent section or the bent sections provides for circulation of the fluid flow about the inflow side of the filter medium body whereby the separation of dirt particles is also promoted and, moreover, a uniform inflow into the filter medium body across its inflow side is improved.

It can be expedient that the curvature of at least one bent section of the inlet channel is not constant. Such a curvature is located in particular at a central part of the concerned bent section while the upstream part and the downstream part have a smaller curvature. The largest curvature in the central part of the bent section promotes the separation of the entrained dirt particles by impinging on the inner side of the inflow channel wall.

In a preferred embodiment, the inlet channel comprises in at least one channel section a ramp-shaped course along the circumference of the filter housing wherein the ramp-shaped course preferably is configured such that along the flow direction the cross section decreases in axial direction of the at least one channel section. The ramp-shaped course extends at least in one channel section along the longitudinal side of an oval filter housing and is preferably continued in a bent section adjoining the channel section. Further preferred, the ramp-shaped course along the circumference of the filter housing is flat in relation to a plane perpendicular to the central axis, preferably at an angle of less than 30°.

Preferably, in this context the at least one channel section is embodied open toward the filter base housing or filter element so that, due to the ramp-shaped course, a transfer of the flow distributed along the circumference of the filter housing can be effected from the inlet housing into the filter base housing to the filter element via a flow passage arranged about the end of the filter element. The arrangement of the ramp-shaped course at least partially in the region of or along a longitudinal side of the filter housing or of the filter housing outer wall contributes to supplying a larger portion of the flow already to the flow region around the filter element prior to the flow circulating about the filter element in the region of the narrow side, which is more strongly bent in comparison to the longitudinal side, being subjected to a strong preseparation-effective deflection. Providing at least two bent sections in the inlet channel has the additional advantage that in radial direction, relative to the longitudinal axis of the filter element, a relatively space-saving embodiment of the filter housing and of the filter device is possible. The inlet channel at least mostly does not extend or only slightly extends past the outer contour of the filter base housing in which the filter element is received.

In a further advantageous embodiment, the filter medium body is of a folded configuration wherein the length extension of the filter folds extends in axial direction, relative to the longitudinal axis of the filter element.

According to an advantageous embodiment, at the inflow side of the filter medium body a flow-tight separation element is provided which extends across a partial surface of the filter medium body. The flow-tight separation element prevents or reduces at least an inflow into the filter medium body in this section so that a flow calming action of the raw fluid at the inflow side of the filter medium body is achieved.

The separation element is embodied, for example, as a calming wall or as a separation film and prevents that the fluid to be purified flows at the inflow side at the position of the separation element immediately through the filter medium body. The unpurified raw fluid guided in the direction toward the inflow side is prevented from immediately flowing through the filter medium body at the position of the separation element and is therefore forced to reside in the space at the inflow side of the filter medium body for at least a slightly longer period of time, which entails a flow calming action. Subsequent thereto, the unpurified fluid can flow through the filter medium body. The flow calming action has the result that larger dirt particles entrained in the raw fluid can deposit in the space that is upstream of the inflow side of the filter medium body. Therefore, a preseparation is taking place wherein the separated particles advantageously can be discharged via a discharge valve from the filter housing. Due to the preseparation, the dirt load of the filter medium body is reduced.

According to an advantageous embodiment, the separation element is located at the filter housing in which the filter element with the filter medium body is received. The separation element can be embodied, as needed, as one piece together with the filter housing. For example, the separation element is a calming wall which surrounds the filter medium body in a ring shape and comprises a distance relative to the outer side of the filter medium body.

According to a further advantageous embodiment, the separation element is arranged immediately at the filter element, for example, is applied to the outer side of the filter medium body. For example, the separation element is a separation film which is applied immediately onto the outer side of the filter medium body. In the region of the separation film, no immediate radial inflow into the filter medium body is possible. In a folded configuration of the filter medium body, the separation film is resting on the outer edges of the filter folds, wherein spreading of raw fluid at the inflow side is possible along the longitudinal extension of the filter folds. In this way, raw fluid which radially enters at a location of the filter medium body without such a separation film can be guided along the longitudinal extension of the folds axially to the region in which the separation film is located whereupon the filter medium body is radially flowed through in this section also. In this way, the section of the filter medium body which is covered by the separation film can also be used for filtration.

In a further advantageous embodiment, it is possible to provide a separation element in the form of a housing-associated calming wall as well as a further separation element in the form of a filter element-associated separation film. These two separation elements are located in particular at axially oppositely positioned sides of the filter medium body of the filter element.

In any case, it is expedient that the separation element, or the sum of all separation elements, extends only across a partial surface at the inflow side of the filter medium body so that a further partial section at the inflow side of the filter medium body remains free of such a separation element.

According to yet another advantageous embodiment, the separation element extends, beginning at an axial end face of the filter medium body, in axial direction as well as completely in circumferential direction of the filter medium body. The axial extension of the calming element is however in any case less than the axial total length of the filter medium body so that a partial section of the filter medium body remains free of the separation element. Advantageously, the axial extension of a separation element is maximally as large as half the axial total length of the filter medium body, for example, maximally only as large as a third of the axial total length of the filter medium body.

In case of a separation film as a separation element, it is expedient that the separation film is connected fixedly to the filter medium body, for example, by gluing or by welding.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
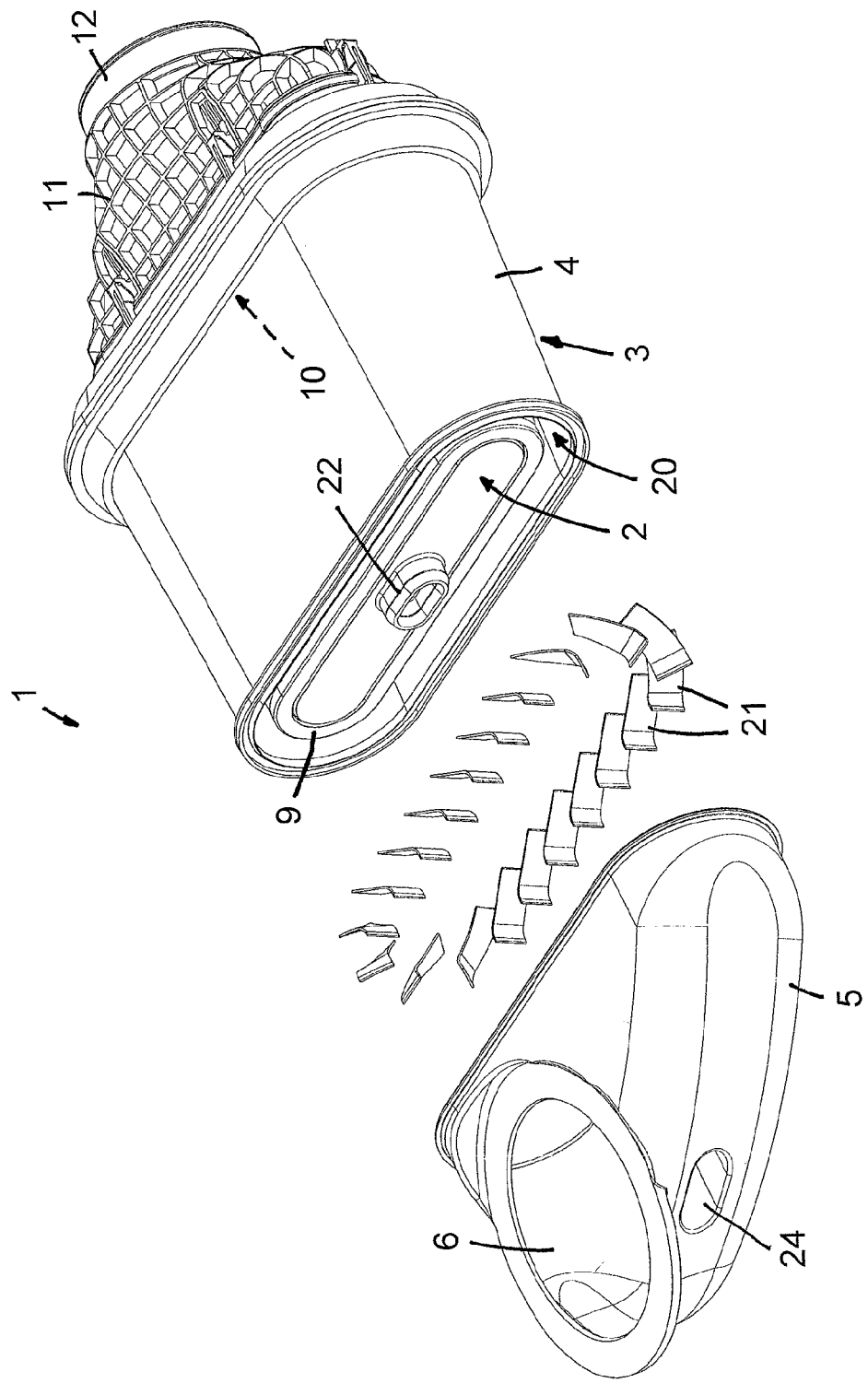
FIG. 1 shows in exploded illustration a filter device as an air filter for an internal combustion engine, with a filter element with elongate cross-sectional shape in a filter housing and with guide vanes in the flow path between an inflow opening in the filter housing and a filter medium body of the filter element.

In the embodiment according to FIGS. 1 to 4, a filter device 1 is illustrated that is embodied as an air filter in an intake manifold of an internal combustion engine for filtration of the combustion air to be supplied to the cylinders of the internal combustion engine. The filter device 1 comprises, as illustrated, a filter element 2 that is preferably flowed through radially and, as further preferred, comprises an elongate, oval cross-sectional shape arranged about the longitudinal axis 15 and is arranged in a filter housing 3 with preferably also oval elongate cross-sectional shape with a filter base housing (part) 4 illustrated in FIG. 1 and an upstream inlet housing (part) 5, both being parts of the filter housing 3. The filter base housing 4 receives the filter element 2. The filter base housing 4 comprises an outer wall arranged about the longitudinal axis 15 with preferably also an oval elongate cross-sectional shape. The filter element 2 and filter housing 3, in particular the outer wall, are preferably designed such that, across the axial length of the filter element 2, the distance between inner side of the outer wall and the filter element 2, in particular the outer side of the filter medium body 7, is circumferentially constant in order to make the flow as resistance-free as possible. The oval cross-sectional shape of filter element 2 and filter housing 3 comprises preferably two oppositely positioned narrow sides with strong curvature that are respectively connected to each other by two oppositely positioned longitudinal sides with weak curvature or even straight course. Preferably, filter element 2 and/or outer wall of the filter base housing 4 are substantially designed to be axis-symmetrical relative to the central or longitudinal axis 15.

In the inlet housing 5 that is to be connected to the filter base housing 4, a preferably lateral, preferably eccentrically arranged, preferably circular, inflow opening 6 is provided via which the combustion air is introduced into the filter housing 3 and is guided in the direction toward the filter element 2. According to FIG. 2, the filter base housing 4 for receiving the filter element 2 is of a one-piece configuration; the inlet housing 5 is also of a one-piece configuration with the filter base housing 4.

The filter element 2 comprises a preferably zigzag-shaped folded filter medium body 7 (FIG. 2) which is embodied in an annular closed configuration and preferably provided with an elongate oval cross-sectional shape. Relative to its central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is preferably lined at its inner side or clean side by a support frame 8 which is comprised of plastic material. The inwardly positioned flow space in the filter medium body 7 forms the clean space in which the purified fluid is collected and from which the purified fluid is axially discharged.

At the two oppositely positioned end faces of the filter element 2, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises a preferably coaxial central outflow opening 12 via which the purified fluid is discharged from the filter device 1.

The cross-sectional shape of the filter element 2 or filter medium body 7 is elongate wherein, relative to the cross section, the two oppositely positioned longitudinal sides are preferably flat and extend, for example, parallel to each other and are connected by curved narrow sides. A straight or slightly curved course of the longitudinal sides enables a particularly suitable configuration for flat installation spaces. The extension of the longitudinal sides is at least twice as large as the distance bridged by the narrow sides, i.e., the distance between the two longitudinal sides. Across the axial length, relative to the central longitudinal axis 15, the filter element 2 and the filter medium body 7 comprise preferably a non-constant cross section which in the region of the closed end disk 9 is smaller than in the oppositely positioned region with the open end disk 10 and increases continuously and uniformly from the smaller to the larger cross section. The filter element is thus preferably conically embodied. The conical shape enhances the dust discharge because thereby a reduced absolute flow rate in the region of the larger diameter can be achieved. This flow calming action can facilitate the deposition of the particles in the housing. Therefore, it is moreover preferred when the non-constant cross section in the direction of the region in which the dust discharge is to be carried out, i.e., presently at the side at which the open end disk 10 and the outflow opening 12 are arranged, is larger than at the axially opposite side.

Adjacent to the housing-associated outlet section 11, the filter base housing 4 is provided with a radially expanded annular space 14 at which a discharge valve 13 is arranged. In the radially expanded annular space 14, separated dirt particles can collect which can be discharged through the discharge valve 13 from the filter housing 3.

At the outer side of the closed end disk 9, a centrally positioned support sleeve 22 is integrally formed with which the filter element 2 can be axially supported from the exterior. For this purpose, a support is integrally formed in the inlet housing 5 and is axially aligned with the support sleeve 22.

The combustion air which is introduced through the inlet opening 6 flows in the direction toward the flow passage 20 that is located between the outer circumference of the closed end disk 9 at the filter medium body 7 and the inner side of the outer wall of the filter base housing 4 which receives the filter element 2. In the flow passage 20, preferably guide vanes 21 are arranged which contribute to imparting a screw-type circulating course to the combustion air flowing in through the inlet channel 29 along the following course in the filter housing 3. The guide vanes 21 have preferably a flat angle relative to the closed end disk 9, for example, between 10 and 40°. In this way, the air flow in the annular space between the inner side of the outer wall of the filter base housing 4 and the filter medium body 7 is caused to move in a circulating circumferential movement so that entrained dirt particles are separated at the inner side of the outer wall of the housing. The deposited dirt particles can be discharged through the discharge valve 13 from the filter housing 3.

The flow path 20 which extends between the outer contour of the end disk 9 and the inner side of the surrounding housing wall of the filter housing part 4 is embodied in an annular circumferential configuration and comprises at least in one part, and preferably only in one part, of its circumferential length the guide vanes 21. Across a further part, the flow path 20 is preferably covered by a cover 25 which extends completely across a narrow side and partially still along one of the two longitudinal sides. In this way, the free part of the flow path that is available for passing of the flow is reduced. Preferably, however, the remaining effective flow cross section of the flow path 20 that is not covered by the cover 25, as in the illustrated embodiment, is at least as large as the cross section of the inflow opening 6. In this way, the incoming air can be guided into the filter housing such that the preseparation is improved. This is realized in particular in that passing of the flow in primarily axial direction is prevented by the cover 25 so that a portion of the incoming air as large as possible is guided into a circumferential rotating flow path.

The inlet housing 5 forms and/or comprises an inlet channel 29 that extends between the inflow opening 6 and an overflow opening 30 wherein the inlet channel 29 in the region of the overflow opening 30 is connected with the filter base housing 4. In the mounted state, the overflow opening 30 that forms the end of the inlet channel 29 is positioned adjacent to the closed end disk 9 of the filter element 2. The combustion air supplied via the inlet channel 29 flows, after exiting from the overflow opening 30, through the flow passage 20 between the outer circumference of the closed end disk 9 and the inner side of the outer wall of the filter housing 3 or preferably, as shown here, of the filter base housing 4.

The inlet channel 29 comprises a first bent section 5a, an intermediately positioned channel section 5b, as well as a second bent section 5c wherein in the region of each bent section 5a, 5c the inlet channel 29 is subjected to a directional change of 90°. The first bent section 5a which adjoins the inflow opening 6 and opens into the intermediately positioned channel section 5b comprises in the region of the inflow opening 6 a preferably circular cross section which changes in the transition to the intermediately positioned channel section 5b to a cross section that is elongate in axial direction. The second bent section 5c, which carries out a further 90° directional change and opens into the overflow opening 30, adjoins the intermediately positioned channel section 5b that comprises the elongate cross-sectional shape. The overflow opening 30 comprises a cross-sectional shape and cross section matched to the facing opening of the filter base housing 4 and is correspondingly elongate like the filter base housing 4.

The cross-sectional shape of the inlet channel 29 changes across its length in such a way that the channel section 5b positioned between the round inlet opening 6 and the overflow opening 30 comprises a cross-sectional shape which differs from the cross-sectional shape of the inlet opening 6 as well as from the cross-sectional shape of the overflow opening 30. The inlet channel 29 comprises a jet-like cross-sectional course in which the cross-sectional shape of the intermediately positioned channel section 5b is flattened relative to the cross-sectional shape of the inflow opening 6 and of the overflow opening 30. In the embodiment, the intermediately positioned channel section 5b has a kind of bread shape; see also FIG. 4 in this context.

The intermediately positioned channel section 5b with flattened cross-sectional shape is of an open configuration in axial direction toward the overflow opening 30, which has an expanded cross section, or toward the flow path 20. Viewed in longitudinal direction of the inlet channel 29, the intermediately positioned channel section 5b opens into the overflow opening 30. The channel section 5b and bent section 5c are preferably arranged at least in partial overlap with the flow path 20, i.e., along the outer circumference of the filter housing 3 and/or of the overflow opening 30.

The longitudinal axis 150 through the inflow opening 6 crosses the longitudinal axis 15 of the filter element 2; it is positioned correspondingly at an angle, in particular approximately at a 90° angle (+/−20) to the longitudinal axis 15, preferably at a lateral distance, without intersecting, relative to the longitudinal axis 15. The orientation substantially perpendicular to the longitudinal axis 15 corresponds to an orientation substantially parallel to the closed end disk 9. The longitudinal axis 150 through the inlet opening 6 can be substantially oriented in the direction of a longitudinal side of the filter housing 3; in this case, the first bent section 5a is omitted. Alternatively, the longitudinal axis 150 through the inflow opening 6, as in the illustrated embodiment, can extend at an angle relative to the longitudinal side, presently approximately perpendicular thereto, along and preferably spaced from the short side of the filter base housing 4. By means of the first bent section 5a, a deflection in radial direction toward the longitudinal axis 15 is achieved, in particular along the longitudinal side of the flow path 20. By means of the second bent section 5c, a further deflection by 90° in the direction of the longitudinal axis 15 is achieved.

The first bent section 5a of the inlet channel 29 is preferably not provided with a constant curvature but is comprised of different parts of different curvature in order to be able to achieve a pressure loss-optimized deflection. The curvature is largest in a central part 31 of the first bent section 5a; immediately upstream of this central part 31 and downstream of this central part 31 of the first curvature section 5a, the curvature is however smaller. This maximal curvature in the central part 31 of the first bent section 5a effects a correspondingly strong directional change so that dirt particles which are entrained in the air flow are already guided in the direction toward the inner side of the inlet wall whereby the separation of these dirt particles is promoted as a result. The deflection of the air mass flow in the second bent section and, parallel and preferably at least partially in overlap thereto, in the narrow side of the filter base housing 4 leads to a transport of particles in outward direction in both regions, wherein the two regions preferably are connected by the flow path 20 to each other. In this way, a preseparation is generated not only within the filter base housing 4 but also already in the flow portions still located in the inlet housing 5 or channel section 5b or bent section 5c.

The tapering of the free flow cross section in the region of the intermediately positioned channel section 5b and the adjoining expansion of the flow cross section in the region of the second bent section 5c effects a jet effect with a flow acceleration and a subsequent flow calming action. In the accelerated flow, the dirt particles are transported outwardly due to their inertia. The subsequent calming action of the air flow leads to a uniform inflow into the filter medium body across its axial length and circumference.

Figure 2:
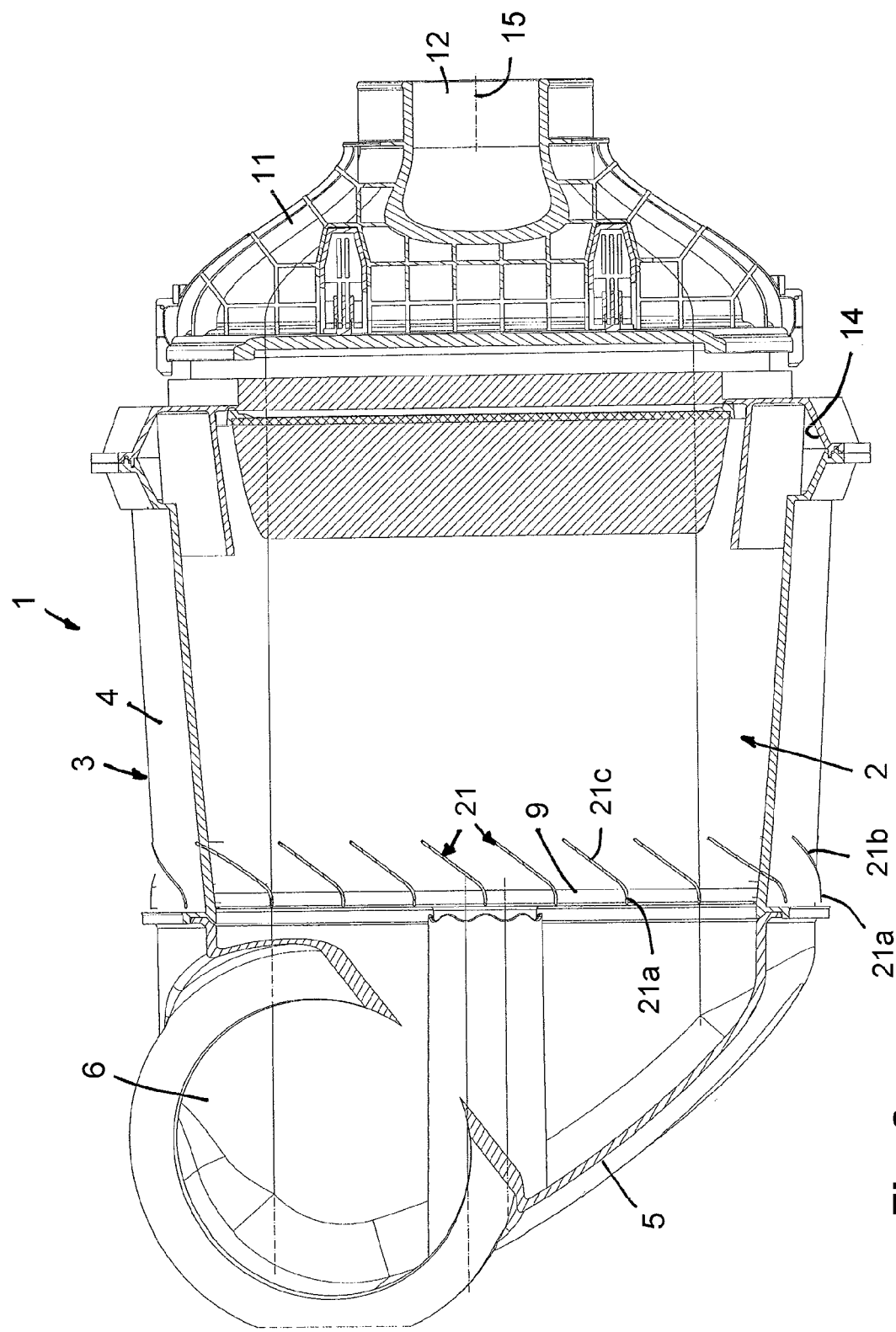
FIG. 2 shows the embodiment of FIG. 1 in longitudinal section.
Figure 3:
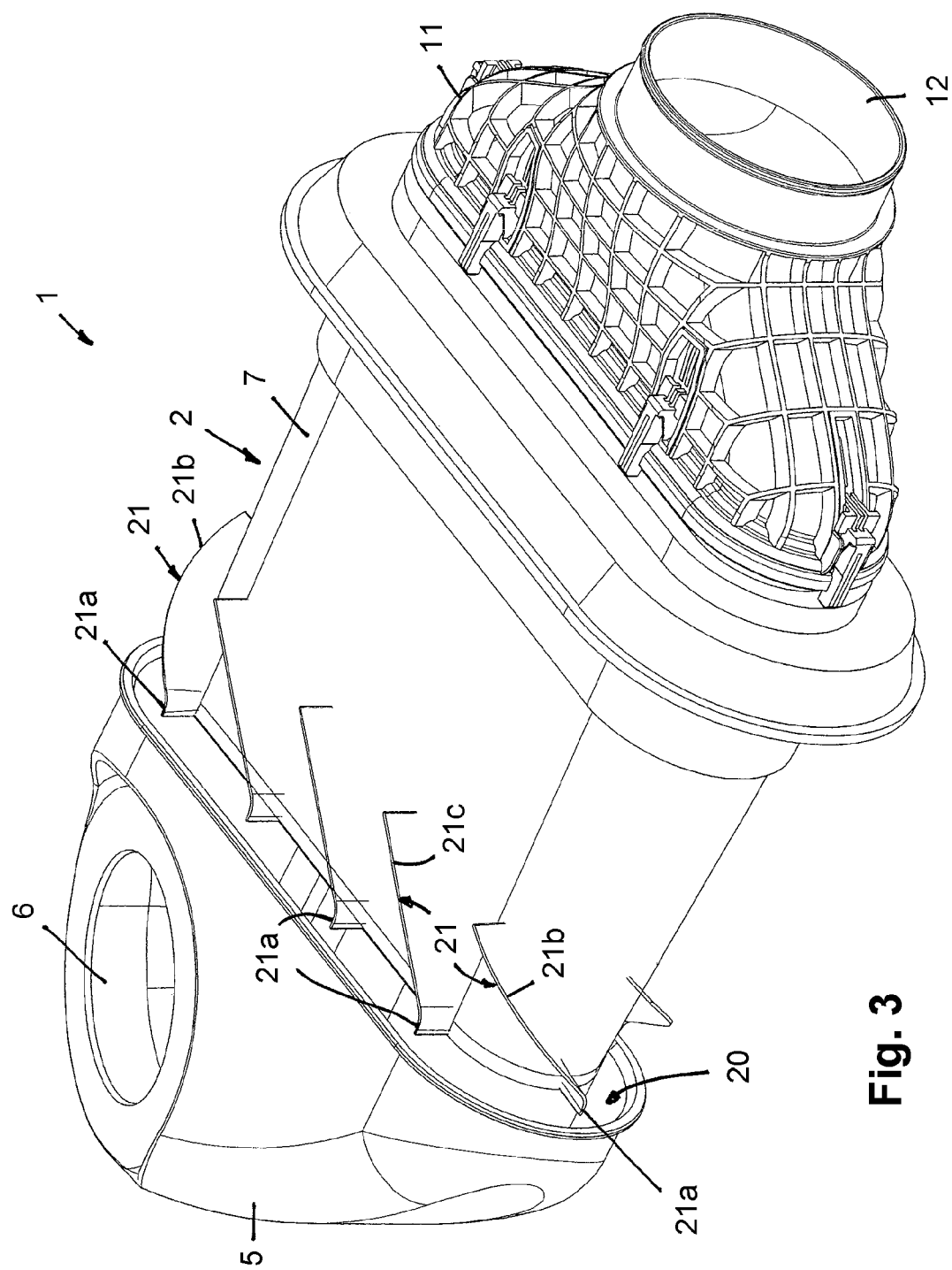
FIG. 3 shows a filter device in mounted state but without a filter base housing.
Figure 4:
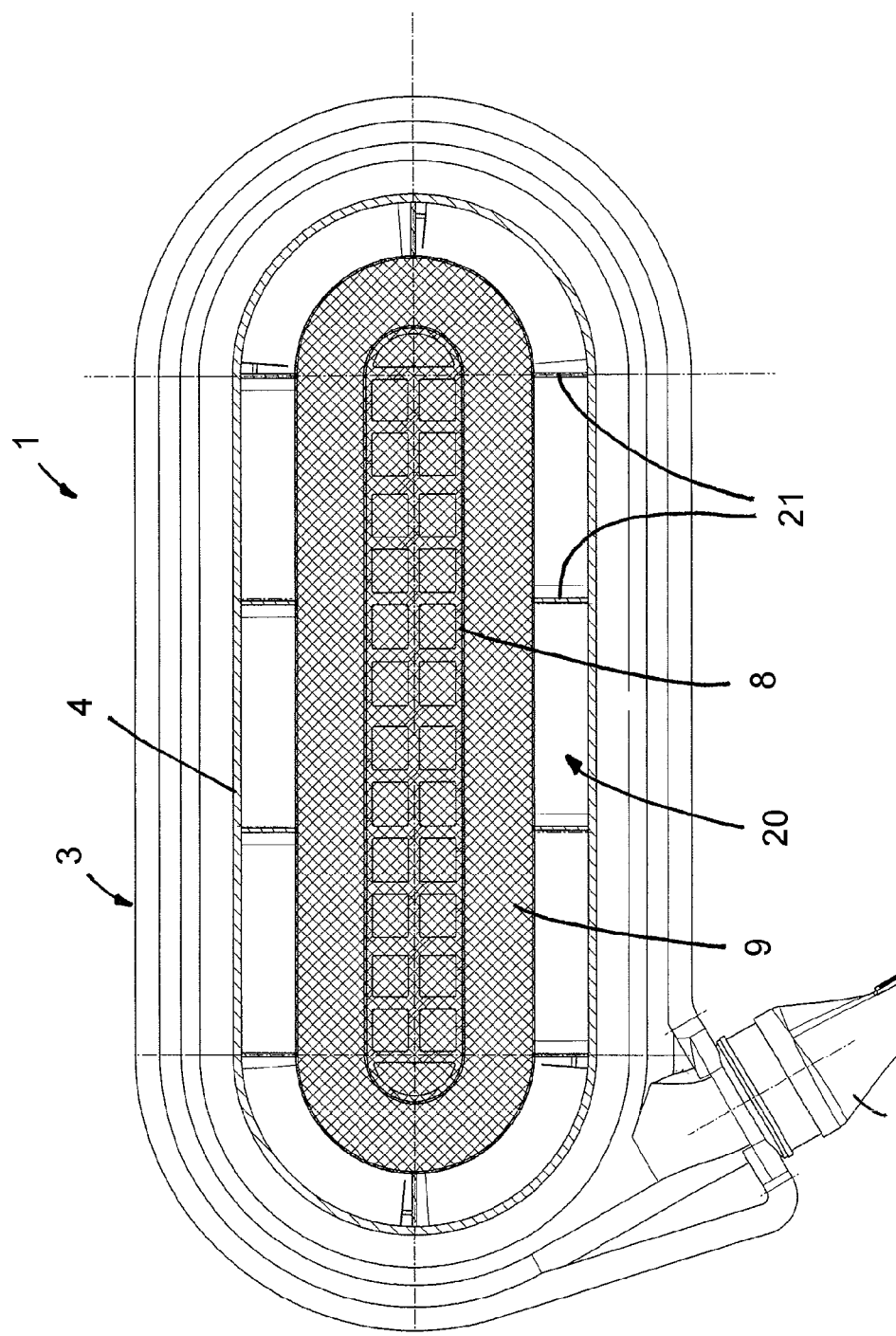
FIG. 4 shows a filter device in a section transverse to the longitudinal axis.

FIG. 4 corresponds to FIG. 2 wherein here the in particular "bread-shaped" flow cross-section 160 of the channel section 5b is illustrated schematically in dashed lines. The flow cross section of the channel section 5b comprises, in particular in comparison to the cross section of the inflow opening 6, a narrow elongate shape in the direction of the longitudinal axis 15 and in the illustrated embodiment, at the section plane which extends approximately at the position illustrated in FIG. 3, is already downwardly open, i.e., toward the filter element 2, wherein, as illustrated, at this location advantageously a direct substantially axial inflow of the filter element 2 is prevented by the cover so that the air is guided on a flow path along the channel section, in particular along the flow passage 20, in particular initially along the longitudinal side. The height of the inlet channel 29 drops along the flow path or along the circumference of the filter housing 3 at least along the channel section 5c. This means that the inlet channel 29, in particular the channel section 5b as well as preferably the second bent section 5c adjoining it, forms a ramp extending along the circumference of the inlet housing 5 or of the filter housing 3 which effects transfer of the flow distributed about the circumference of the filter housing 5 through the flow passage 20 from the inlet housing 5 into the filter base housing 4 and is promoted by the guide vanes 21. As can be seen in FIG. 3, the cover 25 is located adjacent to or at the location at which the inlet channel 29 opens toward the filter element 2 or begins to open, as presently illustrated, preferably in the region of the narrow side of the filter element 2 or filter housing 3 which is facing the inlet opening 6, wherein, as illustrated, the cover also extends across a beginning part of the longitudinal side in flow direction. In this way, the installation space is made available in a pressure loss-optimized way for the flow. The cover 25 promotes in this context that a greatest possible portion of the total flow is imparted with a circumferential path. At the end of the ramp or at the end of the inlet channel 29, preferably, as illustrated, at the second bent section 5c, the inlet channel 29 preferably widens. This enables in the region of strong curvature at the narrow side that a portion of the flow during directional change at the second bent section 5c flows across the end disk 9 or its narrow-sided end region. In this way, the pressure loss at this location can be reduced without having to accept noticeable losses in regard to the degree of preseparation.

The guide vanes 21 are preferably fixedly connected to the closed end disk 9 and project in radial direction past the outer contour of the end disk 9. Advantageously, the guide vanes 21 extend all the way to the inner side of the outer wall of the receiving filter base housing 4.

The guide vanes 21 are comprised respectively of a fastening section 21a and a flow guiding section 21b or 21c wherein fastening section and flow guiding section are formed as one piece. By means of the fastening section 21a, the guide vanes 21 are connected to the end disk 9. The flow guiding sections 21b and 21c serve for flow guiding of the supplied combustion air.

Along the narrow sides of the filter medium body 7, curved flow guiding sections 21b are arranged while at the longitudinal sides of the filter medium body 7 flat or at least approximately flat, straight-surfaced flow guiding sections 21c are arranged. The curved flow guiding sections 21b in the region of the narrow sides allow for the curvature of the contour of the narrow sides and follow correspondingly the curvature. In contrast, the longitudinal sides of the filter medium body 7 are flat or straight-surfaced which also enables a correspondingly flat or straight-surfaced embodiment of the flow guiding sections 21c.

The fastening sections 21a and the flow guiding sections 21b or 21c are positioned at an angle relative to each other. The angle between the sections is approximately 60°.

The guide vanes 21 extend, viewed in axial direction, at an angle relative to the filter element longitudinal axis and in the direction toward the filter medium body 7.

The guide vanes 21 are arranged at the end disk 9 in uniform distribution about the circumference.

In the mounted state, the guide vanes 21 are completely arranged within the filter base housing 4.

Figure 5:
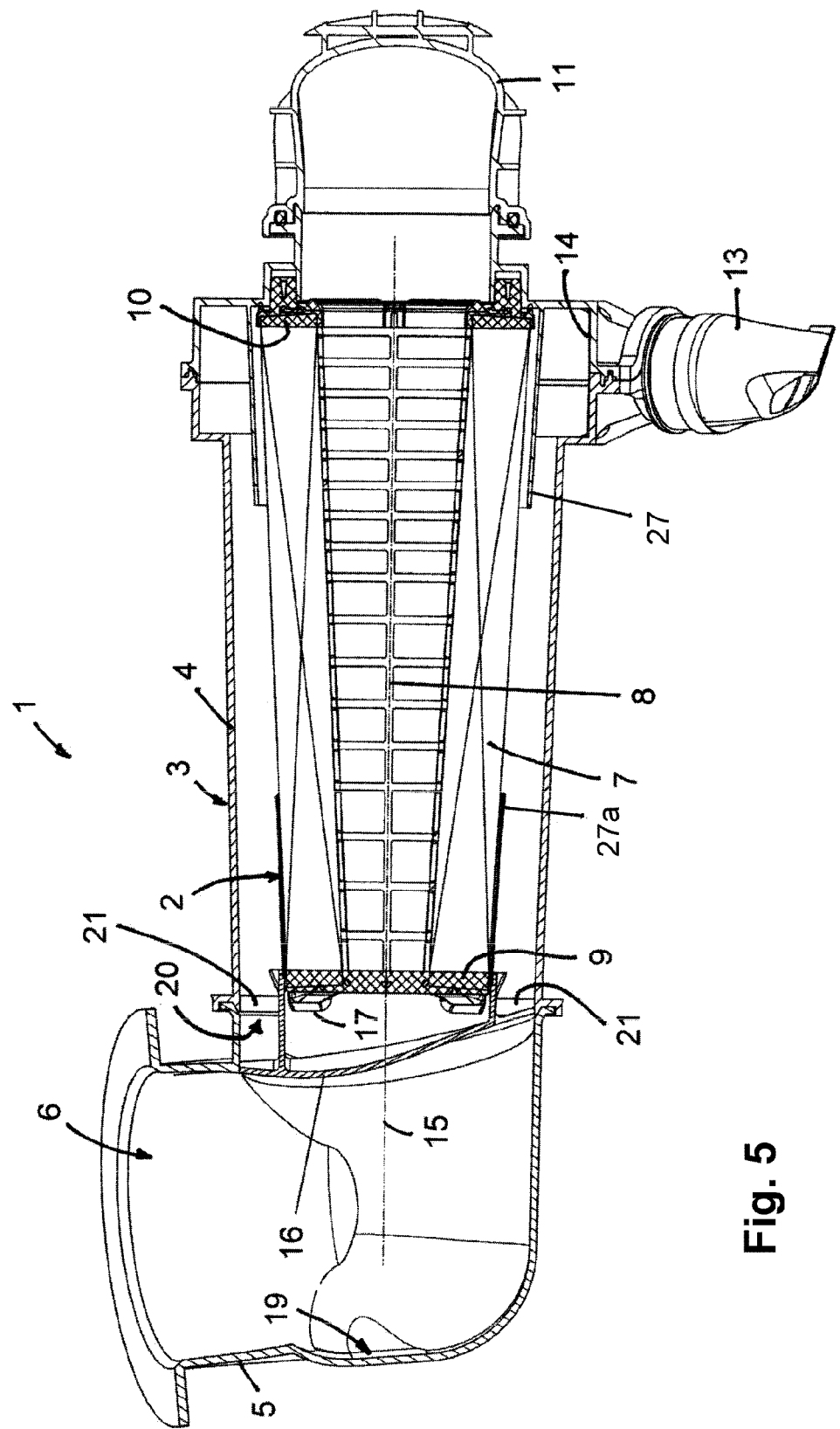
FIG. 5 shows a filter device embodied as an air filter in an embodiment variant.

In FIG. 5, an embodiment variant of a filter device 1 embodied as an air filter is illustrated. The filter device 1 according to FIG. 5 comprises a filter element 2 which is embodied hollow cylindrically or with elongate cross-sectional shape and arranged in a filter housing 3 which comprises a filter base housing 4 and an upstream inlet housing 5. The filter base housing 4 and the inlet housing 5 at which an inflow opening 6 is located are of a one-piece configuration. The filter base housing 4 accommodates the filter element 2 in its receiving space 26. The combustion air to be filtered is introduced via the laterally arranged inflow opening 6 into the filter housing 3 and guided in the direction toward the filter element 2. Relative to the central longitudinal axis 15 of the filter element 2, the inflow opening 6 is positioned laterally or radially displaced wherein the inflow axis of the inflow opening 6 is positioned at an angle of approximately 90° relative to the central longitudinal axis 15 of the filter element 2.

The filter element 2 comprises a filter medium body 7 which is embodied in an annular closed embodiment and provided with an elongate cross-sectional shape. Relative to its central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is lined at its inner side or clean side by a support frame 8 which is comprised of plastic material. The inwardly positioned flow space in the filter medium body 7 forms the clean space in which the purified fluid is collected and from which the purified fluid is axially discharged.

At both oppositely positioned end faces of the filter medium body 7, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter device 1. The outlet section 11 is embodied separate from the filter base housing 4 but is connected to the filter base housing 4.

The cross-sectional shape of the filter element 2 or of the filter medium body 7 can be embodied elongate wherein the longitudinal sides in an exemplary fashion extend flat and parallel to each other and are connected by curved narrow sides. However, a circular cross-sectional shape of the filter element 2 and of the filter medium body 7 is also possible.

The filter element 2 and the filter medium body 7 have across the axial length, relative to the central longitudinal axis 15, a non-constant cross section that is smaller in the region of the closed end disk 9 than in the oppositely positioned region with the open end disk 10 and increases continuously and uniformly from the smaller to the larger cross section.

Adjacent to the housing-associated outlet section 11, in the filter base housing 4 a radially expanded annular space 14 is provided which forms a dirt collecting region and at which a discharge valve 13 is arranged. In the radially expanded dirt collecting region 14 which is of an annular embodiment, the separated dirt particles can collect which can be discharged via the discharge valve 13 from the filter housing 3.

The discharge valve 13 is preferably embodied as a passive valve that can be adjusted by external influences from the usually closed position into an open position in which the dirt particles can be discharged. For example, it is possible to connect the discharge valve 13 to a vacuum source, e.g., to a vacuum side of a cooling fan in a vehicle, so that the discharge valve 13 is opened at sufficiently high vacuum.

The dirt collecting region 14 communicates with the receiving space 26 at the raw or inflow side of the filter medium body 7. The dirt collecting region 14 is located axially adjacent to the end disk 10 of open configuration at the outflow side of the filter element 2. Relative to the axial total length of the filter element 2, the dirt collecting region 14 extends across an axial partial length that amounts to not more than 20% of the total length of the filter element 2. The dirt collecting region 14 is radially expanded relative to the immediately adjoining housing wall of the filter base housing 4. At the axial center of the dirt collecting chamber 14, the filter base housing 4 and the outlet section 11 of the housing abut each other.

In radial direction, the dirt collecting region 14 is separated by a separation element 27 from the filter medium body 7 wherein the separation element 27 is embodied as a circumferentially extending conically embodied calming wall 27 which is part of the filter housing 3. The calming wall 27 forms the radially inwardly positioned boundary wall of the dirt collecting chamber 14. The calming wall 27 extends circumferentially all around and is positioned at a minimal distance relative to the inflow side or raw side of the filter medium body 7. In axial direction, the calming wall 27 extends from an end face section of the filter housing 3, in particular of the outlet section 11, at the level of the end disk 10 past the axial extension of the dirt collecting region 14. The axial length of the calming wall 27 amounts to, for example, at least one fourth of the axial total length of the filter element 2. The calming wall 27 provides for a flow calming action in this axial section in the receiving space 26 and reduces in this section the inflow into the filter medium body 7. The dirt collecting region 14 is in flow communication with the receiving space 26.

Due to the flow calming action and the larger radial extension of the dirt collecting region 14 in comparison to the immediately neighboring housing wall of the filter base housing 4, dirt particles can deposit in the dirt collecting region 14 and are subsequently discharged via the discharge valve 13.

The calming wall 27 is located axially adjacent to the open end disk 10 and extends in axial direction, beginning at the open end disk 10, across a partial region of the filter medium body 7.

The axially oppositely positioned side is provided with a further separation element 27a in the form of a separation film which is applied immediately onto the filter medium body 7. The separation film 27a extends, beginning at the closed end disk 9, in axial direction so that the calming wall 27 and the separation film 27a extend from oppositely positioned end faces axially in the direction toward the center of the filter medium body 7. The axial length of the calming wall 27 and of the separation film 27a is at least approximately of the same size. At the center between the two separation elements 27 and 27a, a partial section of the filter medium body 7 is provided which is free of separation elements and thus can immediately receive radially incoming flow of the raw fluid to be purified.

Both separation elements 27 and 27a provide for a flow calming action of the raw fluid flowing into the inflow space at the inflow side of the filter medium body so that it is possible that coarse dirt particles deposit in the annular space 14 and can be discharged via the discharge valve 13. Despite the separation elements 27 and 27a, the raw fluid can flow into the filter medium body 7 across its entire axial length and its entire inflow side. The calming wall 27 is positioned radially at a distance to the inflow side of the filter medium body 7 so that an annular space is formed between the calming wall 27 and the inflow side of the filter medium body into which the raw fluid can flow.

The filter medium body 7 is of a folded configuration wherein the longitudinal extension of the folds extends parallel to the longitudinal axis 15 of the filter element. In the region of the calming film 27a that is applied immediately onto the filter medium body 7 and, for example, is welded or glued to the filter medium body 7, the raw fluid can flow along the folds of the filter medium body 7, beginning at the partial section of the filter medium body without separation element, axially into the partial region which is covered by the separation film 27a. In this way, the filter medium body 7 is available for filtration of the raw fluid even in the region of the separation film 27a.

What is claimed is:

1. A filter element comprising:
    an annular filter medium body;
    an end disk arranged at an end face of the annular filter medium body;
    guide vanes arranged adjacent to the end disk,
    wherein the guide vanes extend radially past an outer contour of the end disk and project into a flow path upstream of an inflow side of the annular filter medium body;
    wherein the guide vanes are held at the end disk;
    wherein the guide vanes also extend over the inflow side in an axial direction, relative to a longitudinal axis of the filter element;
    wherein the guide vanes include:
        a fastening section having a first end and a second end, the first end fixedly connected to the end disk, the fastening section projecting in the axial direction from the end disk to the second end, projecting axially towards an axially opposite end of the annular filter medium body; and
        a flow guiding section having a first end connected to an opposite end of the fastening section, wherein the fastening section extends in a circumferential direction and is arranged at an acute angle relative to the flow guiding section;
    wherein the fastening section and the flow guiding section are formed in one piece;
    wherein one or more of the guide vanes have a flow guiding section which is curved;
    wherein the annular filter medium body comprises an elongate cross-sectional shape with narrow sides and longitudinal sides, wherein the one or more guide vanes having the curved flow guiding section are arranged in a region of the narrow sides of the filter medium body;
    wherein one or more guide vanes have an at least approximately flat, straight-surfaced flow guiding section and are arranged in a region of the longitudinal sides of the filter medium body.

2. The filter element according to claim 1, wherein the guide vanes are arranged uniformly distributed about a circumference of the end disk.

3. The filter element according to claim 1, wherein the flow guiding section and the fastening section are positioned at an angle in a range between 10° and 80° relative to each other.

4. A filter device comprising:
    a filter element comprising:
        an annular filter medium body;
        an end disk arranged at an end face of the annular filter medium body;
        guide vanes arranged adjacent to the end disk,
        wherein the guide vanes extend radially past an outer contour of the end disk and project into a flow path upstream of an inflow side of the annular filter medium body;
        wherein the guide vanes are held at the end disk;
        wherein the guide vanes extend axially, relative to a longitudinal axis of the filter element, to the inflow side of the annular filter medium body;
        wherein the guide vanes include:
            a fastening section having a first end and a second end, the first end fixedly connected onto the end disk, the fastening section projecting in an axial direction from the end disk to the second end, projecting axially towards an axially opposite end of the annular filter medium body; and
            a flow guiding section having a first end connected to an opposite end of the fastening section, wherein the fastening section extends in a circumferential direction and is arranged at an acute angle relative to the flow guiding section;
        wherein the fastening section and the flow guiding section are formed in one piece;
        wherein one or more of the guide vanes have a flow guiding section which is curved;
        wherein the annular filter medium body comprises an elongate cross-sectional shape with narrow sides and longitudinal sides, wherein the one or more guide vanes having the curved flow guiding section are arranged in a region of the narrow sides of the filter medium body; and
        wherein one or more guide vanes have an at least approximately flat, straight-surfaced flow guiding section and are arranged in a region of the longitudinal sides of the filter medium body;
    a filter housing, wherein the filter element is arranged in the filter housing.

5. The filter device according to claim 4, wherein the guide vanes of the filter element are arranged in a flow passage between an end face of the filter element and an inner side of an outer wall of the filter housing.

6. The filter device according to claim 4, further comprising a flow-tight separation element arranged at or adjacent to the filter medium body of the filter element, wherein the flow-tight separation element extends across a partial surface of the filter medium body at the inflow side.

* * * * *